United States Patent Office 3,720,521
Patented Mar. 13, 1973

3,720,521
PREVENTION OF CAKING OF POWDERED SUGAR
Tokuji Tanaka and Hideaki Hayashi, Tokyo, Japan, assignors to Sankyo Company Limited
No Drawing. Filed Feb. 9, 1971, Ser. No. 114,030
Claims priority, application Japan, Feb. 18, 1970, 45/14,351
Int. Cl. A23l 1/22
U.S. Cl. 99—141 R
4 Claims

ABSTRACT OF THE DISCLOSURE

Powdered sugar having incorporated therein a sufficient amount of invertase to prevent caking.

---

This invention relates to the prevention of the caking of powdered sugar and also to the powdered sugar having a non-caking property.

More particularly, it is concerned with a process for the prevention of the caking of powdered sugar which comprises incorporating a sufficient amount to prevent said caking of invertase into powdered sugar. Also, it is concerned with a new composition of matter, a non-caking powdered sugar having incorporated therein a sufficient amount of invertase to prevent caking.

Powdered sugar has been widely employed in various foods, especially powdery sweets and a variety of cakes. However, such a sugar is highly apt to show a unique solidification phenomenon, so called "caking," which leads to not only difficult problem in the storage thereof but also many serious problems in the production, marketing and application thereof.

Various attempts have been previously made in the art in order to efficiently prevent such caking, for instance by incorporating starches, dextrin, glucose, fructose, dextran, sucrose esters, casein, albumin, powdered milk, calcium lactate, magnesium stearate, tricalcium phosphate, calcium silicate and the like into powdered sugar [U.S. Pat. No. 2,910,386; Industrial and Engineering Chemistry, 25, 142 (1933) and ibid., 51, 1285 (1959)], but favourable results could not be attained in view of failure to keep comfortable taste, unavoidable employment of such an additive unsuitable for a food additive and so on. Thus, it is earnestly desired in the art to develop a new and more satisfactory means for the prevention of such caking.

As a result of our extensive studies on the prevention of such caking, it has now been unexpectedly found that incorporation of a specific enzyme, invertase, into powdered sugar can effectively prevent the caking of the sugar and this invention has been completed upon this finding.

It is, accordingly, a principal object of this invention to provide a new and effective process for the prevention of the caking of powdered sugar.

It is another object of this invention to provide a new type of powdered sugar having a non-caking characteristic.

These and other objects of this invention will become apparent to those skilled in the art from the following description of this invention.

In accordance with this invention, the solidification phenomenon or caking in powdered sugar can be satisfactorily prevented by a process which comprises incorporating a sufficient amount to prevent such caking of invertase into the powdered sugar.

The enzyme which may be employed in this invention, invertase, is known as such and can be readily available from a wide variety of yeasts, e.g., bakers' yeast, beer yeast and the like by a conventional method, for example, according to the teachings in "Methods in Enzymology," vol. 1, pages 252–255, edited by S. P. Colowick and N. O. Kaplan, Academic Press Inc., publishers, N.Y., 1955. Commercially available invertase may, of course, be employed in this invention, if desired, after further purification. In any case, it is desirable in this invention to select and employ a purified form of invertase having a potency as high as possible in order to keep the original color, taste and flavour of the sugar, but any enzymatic preparation containing a suitable amount of invertase may also be favourably employed in this invention so far as the preparation could not impair the natural states of the sugar. Representative of the enzymatic preparation which may be employed in this invention is dry yeast containing invertase in a powdery or granular form.

The amount of the invertase to be incorporated into powdered sugar may be generally in the order of an extremely small quantity. Usually, the enzyme may be added in an amount to provide 10,000 to 30,000 units (Sumner's unit: J. Biol. Chem. 108, 51, 1935) per kg. of the powdered sugar, but there may be satisfactorily employed, if desired, a more or less amount than the above-mentioned range. For example, even in an amount to provide about 5,000 units per kg. of the powdered sugar one can obtain a favourable effect against caking. Although higher units than the above-mentioned upper limit may be effectively employed, a further advantage could not result therefrom, especially from the economical point of view.

The procedures which may be employed in this invention for the incorporation of invertase into powdered sugar are not a critical feature of this invention and the enzyme may be conveniently incorporated into powdered sugar by any conventional and simple procedure.

The following examples are given for the purpose of illustration of this invention, and they should not be construed to be limiting the scope of this invention.

EXAMPLE 1

With 1.3 kg. of powdered sugar was homogeneously admixed 0.1 g. of powdery invertase (Sumner's unit: 270,000 u./g.) and the resulting mixture was packed into a polyethylene bag having a thickness of 0.05 mm., the opening thereof being heat-sealed.

As a control, an equal amount of powdered sugar was similarly packed into a bag without incorporation of invertase.

These bags packed as set forth above were subjected to an aging test by holding them in a vessel maintained at a constant temperature of 40° C. and humidity of 80% for 48 hours.

Then, the results from the aging test clearly show that the powdered sugar having incorporated therein invertase do not exhibit any degree of caking, whereas the control powdered sugar exhibit a remarkable degree of caking and produce a great number of sugar blocks, each having a diameter of 10–20 mm.

Further, the bags according to this invention and those of the control were allowed to stand at room temperature for 1 week. Caking was observed on the control, whereas no degree of caking was observed on the bags according to this invention.

EXAMPLE 2

The same procedure as set forth in the above Example 1 was effected except that 3 g. of a dry yeast powder containing invertase (Sumner's unit 6,000 u./g.) per kg. of the powdered sugar was employed instead of the 0.1 g. of powdery invertase. Substantially similar results were obtained.

What is claimed is:

1. A process for the prevention of the caking of powdered sugar which comprises incorporating from 10,000 to 30,000 units of invertase per kilogram of said powdered sugar into said powdered sugar to prevent caking.

2. The process according to claim 1 wherein said invertase is employed in the form of a powder or an enzymatic preparation containing it.

3. A powdered sugar having incorporated therein from 10,000 to 30,000 units of invertase per kilogram of said powdered sugar.

4. The powdered sugar of claim 3, wherein said invertase is in the form of a powder or an enzymatic preparation containing it.

References Cited

UNITED STATES PATENTS 1,919,675  7/1933  Wallerstein _____ 195—63

ALVIN E. TANENHOLTZ, Primary Examiner

J. M. HUNTER, Assistant Examiner